(12) United States Patent
Wu et al.

(10) Patent No.: US 11,656,828 B2
(45) Date of Patent: May 23, 2023

(54) ELECTRONIC SYSTEM AND DISPLAY DEVICE

(71) Applicants: Inventec (Pudong) Technology Corp., Shanghai (CN); Inventec Corporation, Taipei (TW)

(72) Inventors: Cheng-Yu Wu, Taipei (TW); Ming-Yuan Liu, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 190 days.

(21) Appl. No.: 17/348,738

(22) Filed: Jun. 15, 2021

(65) Prior Publication Data

US 2022/0300232 A1    Sep. 22, 2022

(30) Foreign Application Priority Data

Mar. 16, 2021    (CN) .......................... 202110281326.6

(51) Int. Cl.
| | |
|---|---|
| *G06F 3/14* | (2006.01) |
| *G09G 3/20* | (2006.01) |
| *G06F 3/041* | (2006.01) |
| *G06F 13/42* | (2006.01) |
| *H04B 7/0413* | (2017.01) |
| *H04N 7/04* | (2006.01) |
| *H04W 84/04* | (2009.01) |

(52) U.S. Cl.
CPC .............. *G06F 3/14* (2013.01); *G06F 3/0416* (2013.01); *G06F 13/4282* (2013.01); *G09G 3/20* (2013.01); *G06F 2213/0042* (2013.01); *G09G 2370/02* (2013.01); *G09G 2370/042* (2013.01); *G09G 2370/12* (2013.01); *G09G 2370/16* (2013.01); *H04B 7/0413* (2013.01); *H04N 7/04* (2013.01); *H04W 84/042* (2013.01)

(58) Field of Classification Search
CPC ..... G06F 3/0416; G06F 13/4282; G09G 3/20; G09G 2370/02; G09G 2370/16; G09G 2370/042; G09G 2370/12; H04B 7/0413
See application file for complete search history.

(56) References Cited

U.S. PATENT DOCUMENTS

| | | | |
|---|---|---|---|
| 2014/0292694 A1* | 10/2014 | Lin ....................... | G06F 3/0416 345/173 |
| 2017/0308498 A1* | 10/2017 | Chen .................... | G06F 13/4022 |
| 2022/0321948 A1* | 10/2022 | Cai ................... | H04N 21/43632 |

* cited by examiner

*Primary Examiner* — Abbas I Abdulselam
(74) *Attorney, Agent, or Firm* — Winston Hsu

(57) ABSTRACT

An electronic system is provided, which includes a host device and a display device. The host device includes a first signal conversion circuit and a first signal transmission circuit. The first signal conversion circuit is utilized for converting signals associated with the host device into a first universal serial bus signal. The display device includes a display panel, a second signal conversion circuit and a second signal transmission circuit. The second signal transmission circuit is utilized for receiving the first universal serial bus signal. The second signal conversion circuit is coupled to the second signal transmission circuit for converting the first universal serial bus signal into the signals associated with the host device. The first universal serial bus signal conforms to universal serial bus 4.0 or above version standard specification.

15 Claims, 4 Drawing Sheets

ELECTRONIC SYSTEM AND DISPLAY DEVICE

BACKGROUND OF THE INVENTION

1. Field of the Invention

The present invention relates to an electronic system and display device, and more particularly, to an electronic system and display device capable of simplifying the cable management process and facilitating automated assembly manufacturing process.

2. Description of the Prior Art

With development of display technology, a display device, such as liquid crystal display (LCD), is widely applied in various electronic products, such as notebooks, desktop computers, mobile handsets, televisions. When an image source is connected to the display device, the image source may provide image signals to the display device for display.

Please refer to FIG. 1, which is a schematic diagram of a conventional display device 1. The display device 1 includes a display panel 102, a camera module 104, a cable assembly 106 and a cable bracket 108. During product manufacturing process, multiple related signal cables may be arranged and organized into a single cable assembly 106, and the cable assembly 106 may be mounted and fixed on the bracket 108. Further, the cable assembly 106 may pass through the base assembly (e.g., the base shaft) of the display device 1 so that the display device 1 can transmit signals to the external device. For example, the display panel 102 may transmit image frame signals of embedded display port (eDP) via a signal cable 110. The eDP signal would need to use signal cables with four lanes for signal transmission. As such, the signal cable 110 may be usually a signal cable with forty to fifty pins. In addition, the camera module 104 includes a camera, a microphone and a light sensor. The camera module 104 may transmit camera image signals, microphone signals and sensing signals of inter-integrated circuit (I2C) bus interface through a signal cable 112. The signal cable 112 usually includes twenty or more pins for transmitting signals. Thus, in order to connect with an external device for performing related signal transmission, it is necessary to arrange and fix a large number of signal cables on the cable bracket 108 of the display device 1 and the cable assembly 106 also needs to pass through the base shaft of the display device 1. As a result, it is difficult to manage and arrange the signal cable during manufacturing and the process of arranging the signal cables is time-consuming and labor-intensive, and thus not suitable for automated production. Thus, there is a need for improvement.

SUMMARY OF THE INVENTION

It is therefore a primary objective of the present invention to provide an electronic system and display device capable of simplifying the cable management process and facilitating automated assembly manufacturing process, in order to resolve the aforementioned problems.

The present invention discloses an electronic system, comprising: a host device, comprising: a first signal conversion circuit for converting signals associated with the host device into a first universal serial bus signal; and a first signal transmission circuit coupled to the first signal conversion circuit for transmitting the first universal serial bus signal; and a display device, comprising: a display panel; a second signal transmission circuit for receiving the first universal serial bus signal from the first signal transmission circuit or transmitting a second universal serial bus signal associated with the display device to the first signal transmission circuit; and a second signal conversion circuit coupled to the second signal transmission circuit for converting the first universal serial bus signal into the signals associated with the host device or converting signals associated with the display device into the second universal serial bus signal; wherein the first universal serial bus signal and the second universal serial bus signal conform to universal serial bus 4.0 or above version standard specification.

The present invention further discloses a display device, comprising: a display panel; a signal conversion circuit for converting a first universal serial bus signal associated with a host device into signals associated with the host device or converting signals associated with the display device into a second universal serial bus signal; and a signal transmission circuit coupled to the signal transmission circuit for receiving first universal serial bus signal transmitted by the host device or transmitting the second universal serial bus signal to the host device; wherein the first universal serial bus signal and the second universal serial bus signal conform to universal serial bus 4.0 or above version standard specification.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
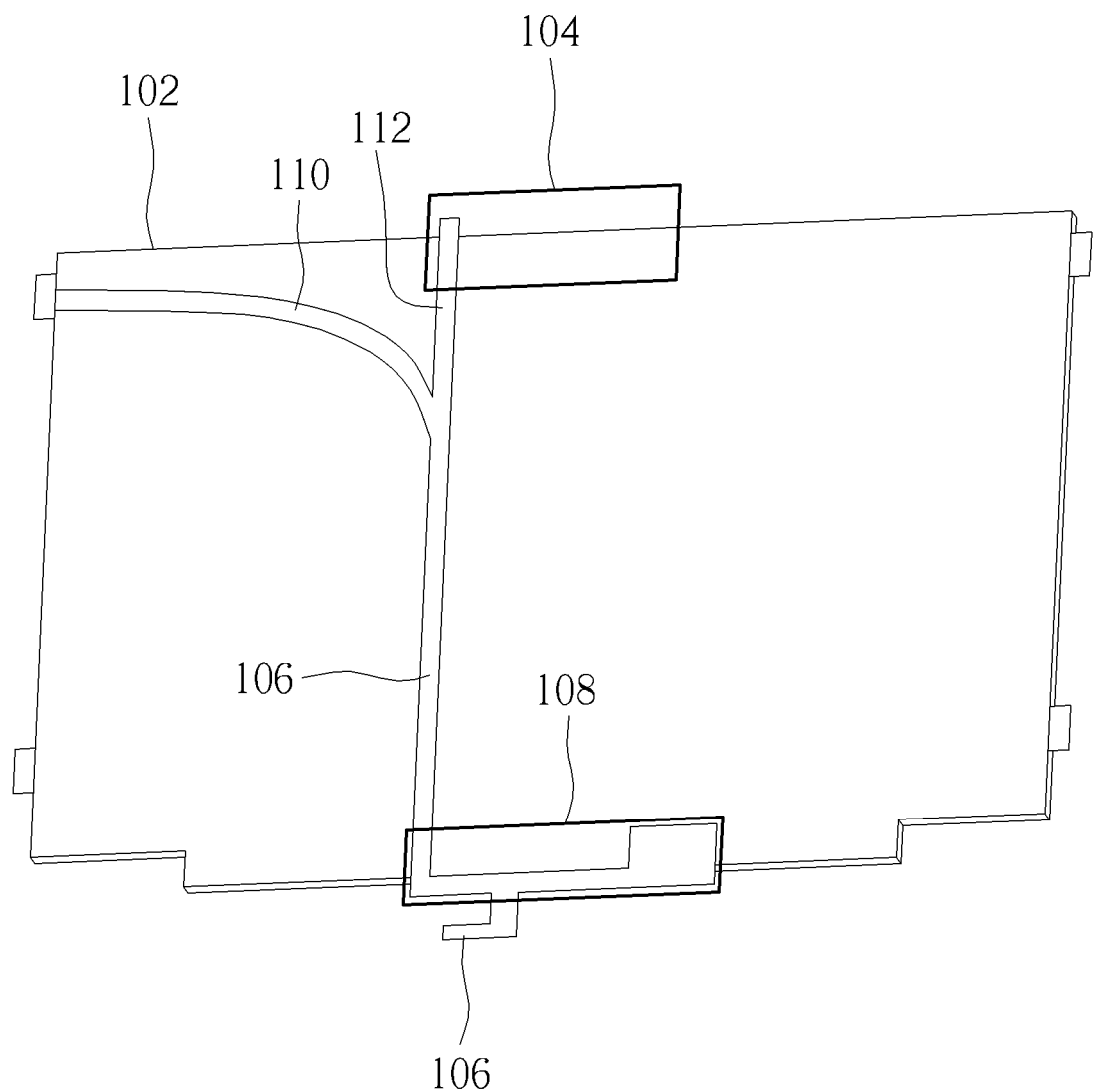
FIG. 1 is a schematic diagram of a conventional display device according to the prior art.
Figure 2:
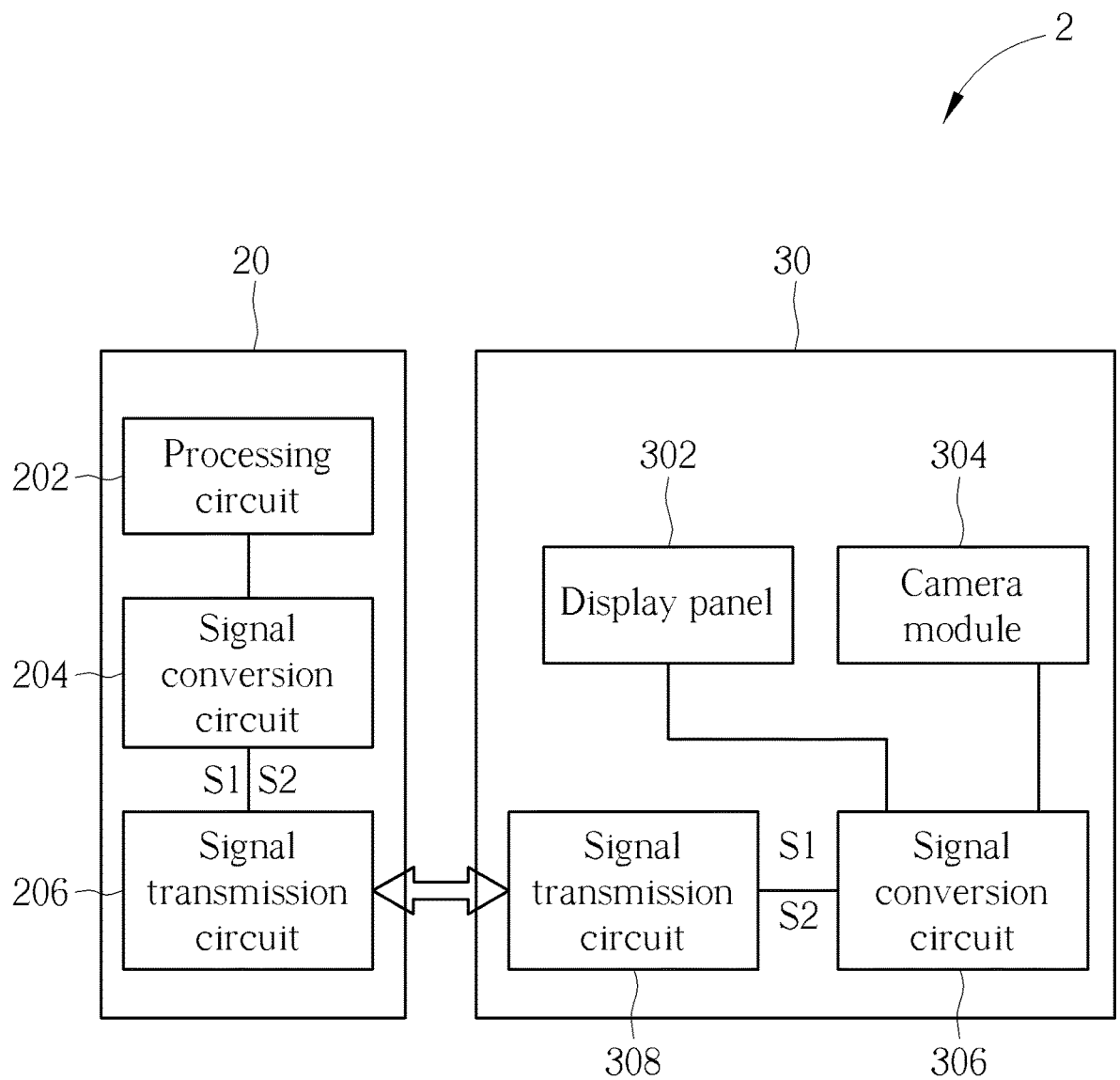
FIG. 2 is a schematic diagram of an electronic system according to an embodiment of the present invention.

Please refer to FIG. 2, which is a schematic diagram of an electronic system 2 according to an embodiment of the present invention. The electronic system 2 includes a host device 20 and a display device 30. The host device 20 includes a processing circuit 202, a signal conversion circuit 204 and a signal transmission circuit 206. The host device 20 may be a desktop computer, a server computer, a notebook, a storage device, a mobile communication device, an embedded system product, or a wearable device, but not limited thereto. The processing circuit 202 may be a central processing unit (CPU), a microprocessor, a digital signal processor (DSP), any other similar processing device, or combination thereof, but not limited thereto. The signal conversion circuit 204 is configured to convert signals associated with the host device 20 into a universal serial bus (USB) signal S1 or convert a USB signal S2 from the display device 30 into signals associated with the display device 30. The signals associated with the host device 20 may include signals generated or stored by related assemblies of the host device 20, such as control signals generated by the processing circuit 202, image frame signals outputted by the processing circuit 202. The USB signals S1 and S2 may conform to USB 4.0 or above version standard specification. The signal conversion circuit 204 may be disposed on a USB hub board of the host device 20. The signal transmission circuit 206 is coupled to the signal conversion circuit 204. The signal transmission circuit 206 is configured to transmit the USB signal S1 to the display device 30 or receive the USB signal S2 from the display device 30.

The display device 30 includes a display panel 302, a camera module 304, a signal conversion circuit 306 and a signal transmission circuit 308. The display panel 302 may be a liquid crystal display (LCD) or an organic light-emitting diode (OLED) display, but not limited thereto. In addition, the display device 30 further includes a display driving circuit (no shown in figures) for controlling display panel 302 for displaying images. The signal conversion circuit 306 is configured to convert signals associated with the display device 30 into the USB signal S2 or convert the UBS signal S1 into the signals associated with the host device 20. The signals associated with the display device 30 may include signals generated or stored by related assemblies of the display device 30, such as signals generated or stored by the display panel 320 or the camera module 304. The signal conversion circuit 306 may be disposed on a USB hub board of the display device 30. The signal transmission circuit 308 is coupled to the signal conversion circuit 306. The signal transmission circuit 308 is configured to transmit the USB signal S2 to the host device 20 or receive the USB signal S1 from the host device 20. The USB signals S1 and S2 may conform to USB 4.0 or above version standard specification.

In an embodiment, the signal conversion circuit 204 converts the signals associated with the host device 20 into the USB signal S1. The signal transmission circuit 206 transmits the USB signal S1 to the signal transmission circuit 308 of the display device 30. The signal transmission circuit 308 receives the USB signal S1 and provides the USB signal S1 to the signal conversion circuit 306. The signal conversion circuit 306 converts the UBS signal S1 into the signals associated with the host device 20 for the following operation of the display device 30. In an embodiment, when the signal conversion circuit 306 converts the signals associated with the display device 30 into the USB signal S2. The signal transmission circuit 308 transmits the USB signal S2 to the signal transmission circuit 206 of the host device 20. The signal transmission circuit 206 receives the USB signal S2 and provides the USB signal S2 to the signal conversion circuit 204. The signal conversion circuit 204 converts the UBS signal S2 into the signals associated with the display device 30 for the following operation of the host device 20. Since the display device 30 utilizes the signal conversion circuit 306 to convert the UBS signal S2 with single signal specification (conforming to USB 4.0 or above version standard specification) and utilizes the signal transmission circuit 308 to transmit the UBS signal S2 to the host device 20 or other device. The display device 30 utilizes signal transmission circuit 308 and the signal conversion circuit 306 to receive and convert the UBS signal S1 with single standard specification and convert the UBS signal S1 into the signals associated with the host device 20 for operation. Therefore, the display device 30 does not need to a large number of other additional cables to transmit or receive the transmission signal, thus simplifying the cable management process and facilitating automated assembly manufacturing process.

Figure 3:
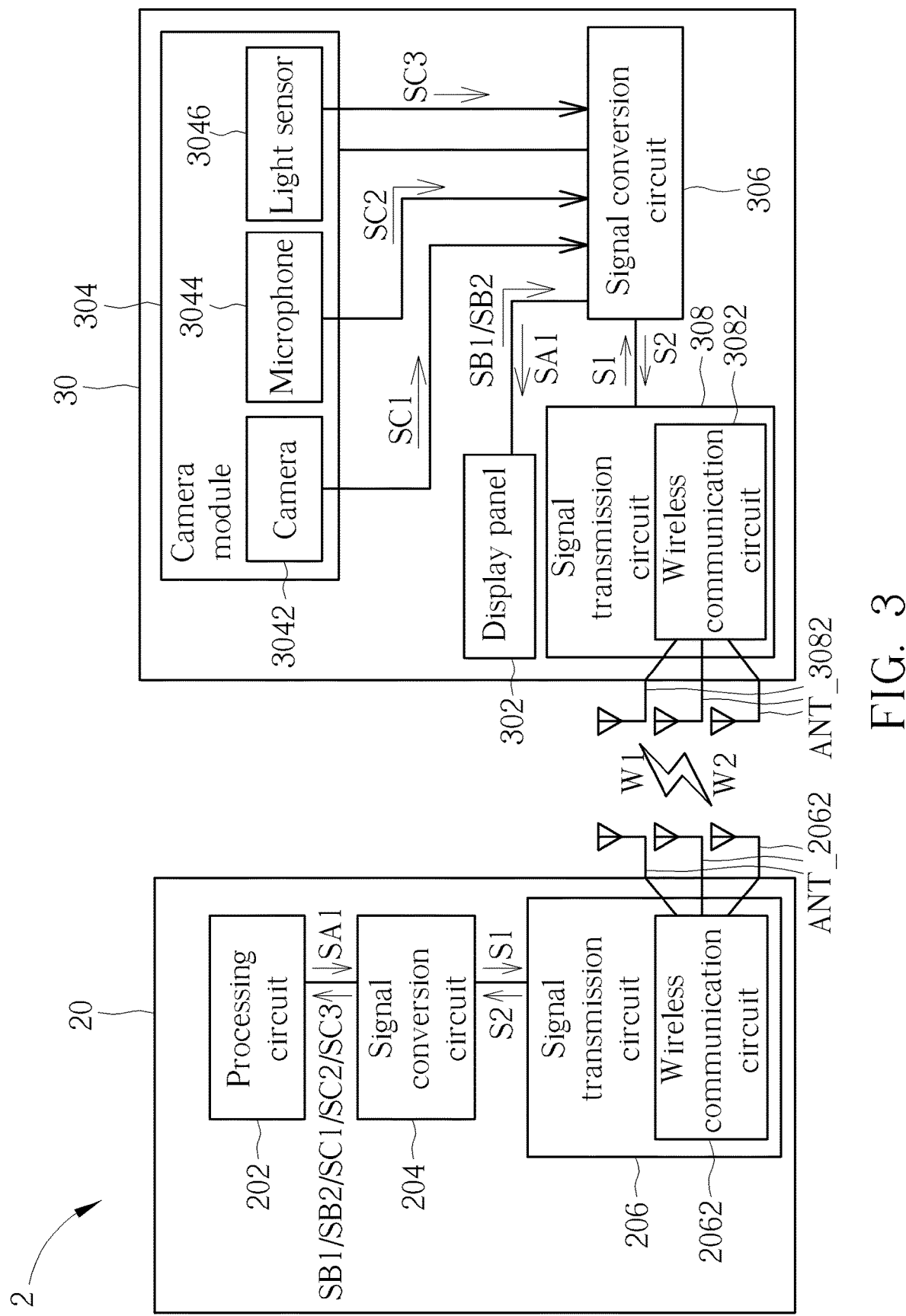
FIG. 3 and FIG. 4 are schematic diagrams of the electronic system according to alternative embodiments of the invention.

Please refer to FIG. 3. FIG. 3 is a schematic diagram of operations of the electronic system 2 shown in FIG. 2 according to an alternative embodiment of the invention. The signal transmission circuit 206 includes a wireless communication circuit 2062. The signal transmission circuit 308 includes a wireless communication circuit 3082. The camera module 304 includes a camera 3042, a microphone 3044 and a light sensor 3046. The wireless communication circuit 2062 may transmit the USB S1 converted by the signal conversion circuit 204 to the wireless communication circuit 3082 of the display device 30 in a wireless manner, i.e. through wireless communications. The wireless communication circuit 2062 may also receive the USB S2 transmitted by the wireless communication circuit 3082 in the wireless manner. The wireless communication circuit 3082 may transmit the USB S2 converted by the signal conversion circuit 306 to the wireless communication circuit 2062 of the host device 20 in the wireless manner, i.e. through wireless communication. The wireless communication circuit 3082 may also receive the USB S1 transmitted by the wireless communication circuit 2062 in the wireless manner. The wireless communication circuit 2062 and the wireless communication circuit 3082 may support at least one of fifth generation mobile communication network (5G), fifth generation new radio (5G NR), long term evolution (LTE), third generation mobile communication network (3G), second generation mobile communication network (2G), global system for mobile (GSM), Wi-Fi, wireless LAN (WLAN), Bluetooth. The wireless communication circuit 2062 further includes a plurality of antennas ANT_2062. The wireless communication circuit 3082 further includes a plurality of antennas ANT_3082. The wireless communication circuit 2062 may transmit and receive signals via the antenna ANT_2062. The wireless communication circuit 3082 may transmit and receive signals via the antenna ANT_3082. The antenna ANT_2062 and the antenna ANT_3082 may be multiple-input multiple-output (MIMO) antennas. For example, the wireless communication circuit 2062 and the wireless communication circuit 3082 may be 5G millimeter wave (mmWave) wireless communication circuits, and the antenna ANT_2062 and the antenna ANT_3082 may be 5G MIMO antennas.

In an embodiment, when the host device 20 wants to provide an image frame signal SA1 to the display device 30 for display. As show in FIG. 3, the processing circuit 202 is configured to generate the image frame signal SA1. For example, the image frame signal SA1 may be an image frame signal of an embedded display port (eDP) interface. The signal conversion circuit 204 converts the image frame signal SA1 into the USB signal S1. The USB signal S1 may conform to USB 4.0 or above version standard specification. Further, the wireless communication circuit 2062 converts the USB signal S1 into a wireless transmission signal W1 and the wireless transmission signal W1 is transmitted to the display device 30 through the antenna ANT_2062 by using wireless transmission methods. For example, the wireless communication circuits 2062 and 3082 may be 5G mmWave wireless communication circuits. The wireless communication circuits 2062 and 3082 may convert signals by using network slicing method. The antenna ANT_2062 and ANT_3082 may be 5G MIMO antennas. When the wireless communication circuit 2062 converts the USB signal S1 into the wireless transmission signal W1, the wireless transmission signal W1 may be transmitted to the display device 30 by the antenna ANT_2062. After the antenna ANT_3082 of the display device 30 receives the wireless transmission signal W1, the wireless communication circuit 3082 converts the wireless transmission signal W1 into the USB signal S1 and provides the USB signal S1 to the signal conversion circuit 306. The signal conversion circuit 306 converts the USB signal S1 into the image frame signal SA1 and provides the image frame signal SA1 to the display panel 302. The display panel 302 receives the image frame signal SA1 and displays the image frame signal SA1. Therefore, the display device 30 may receive the image frame signal SA1 provided by the host device 20 through the wireless communication circuit 3082, without using dozens of signal cables to connect with the host device 2 for signal transmission.

In an embodiment, the display panel 302 may generate an identification signal SB1. For example, the identification signal SB1 may be extended display identification data (EDID) of the display device 30. The identification signal SB1 may be a high definition multimedia interface (HDMI) transmission interface signal or a Thunderbolt transmission interface signal. The display panel 302 may be a touch panel. The display panel 302 may detect touch operations and generate a touch detection signal SB2. For example, the display panel 302 may detect touch operations of touch point by using self-capacitance or mutual-capacitance method, but not limited thereto. The touch detection signal SB2 may be an inter integrated circuit bus (I2C) signal or an eDP signal. The camera 3042 is configured to generate a camera image signal SC1. The microphone 3044 is configured to acquire the current environment sound and accordingly generate an audio signal SC2. The light sensor 3046 is configured to sense and generate a light detection signal SC3. The light sensor 3046 may be an ambient light sensor (ALS), but not limited thereto. For example, the camera image signal SC1 and the light detection signal SC3 may be I2C signals. The audio signal SC2 may be a USB 2.0 signal.

As shown in FIG. 3, the signals associated with the display device 30 includes the identification signal SB1, the touch detection signal SB2, the camera image signal SC1, the audio signal SC2 and the light detection signal SC3. According to system requirements, the signal conversion circuit 306 may convert at least one the signals associated with the display device 30 into the corresponding USB signal S2. For example, if the display device 30 needs to provide the identification signal SB1, the touch detection signal SB2, the camera image signal SC1, the audio signal SC2 and the light detection signal SC3 to the host device 20, the signal conversion circuit 306 may convert the identification signal SB1, the touch detection signal SB2, the camera image signal SC1, the audio signal SC2 and the light detection signal SC3 into the USB signal S2. The USB signal S2 may conform to USB 4.0 or above version standard specification. Moreover, the wireless communication circuit 3082 converts the USB signal S2 into a wireless transmission signal W2 and the wireless transmission signal W2 is transmitted to the wireless communication circuit 2062 of the host device 20 through the antenna ANT_3082 by using wireless transmission methods. After the antenna ANT_2062 of the host device 2 receives the wireless transmission signal W2, the wireless communication circuit 2062 converts the wireless transmission signal W2 into the USB signal S2 and provides the USB signal S2 to the signal conversion circuit 204. The signal conversion circuit 204 converts the USB signal S2 into the identification signal SB1, the touch detection signal SB2, the camera image signal SC1, the audio signal SC2 and the light detection signal SC3, and provides the identification signal SB1, the touch detection signal SB2, the camera image signal SC1, the audio signal SC2 and the light detection signal SC3 to the processing circuit 202 for the following operation. In other words, The display device 30 may wirelessly transmit the relevant signals which are actually required by the host device 20 through the wireless communication circuit 3082 or receive signals from the host device 20 in the wireless manner, without using a large number of signal cables to connect with the host device 2, thus saving significant cost of related signal cable, simplifying the cable management process and facilitating automated assembly manufacturing process.

Figure 4:
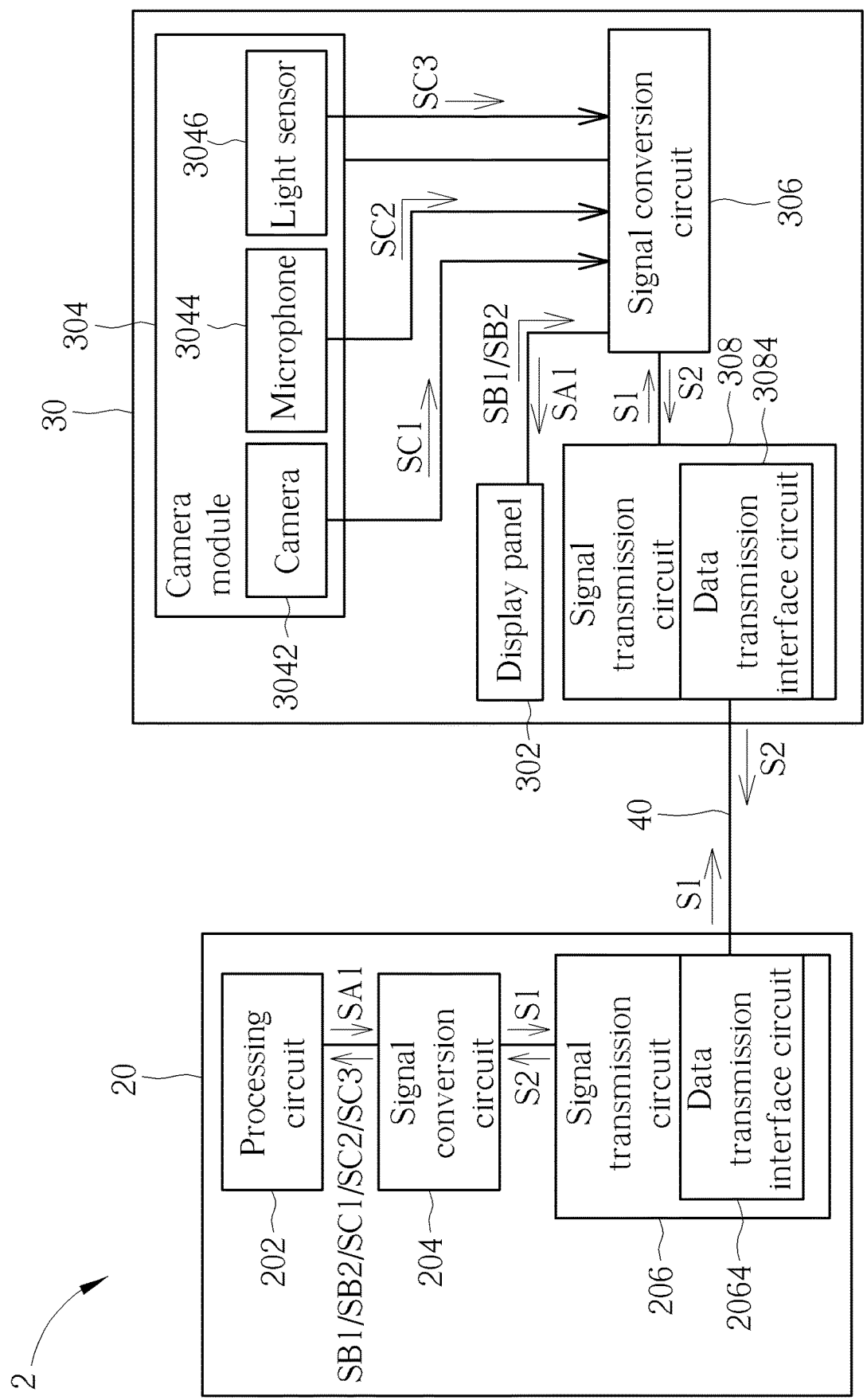

Please refer to FIG. 4. FIG. 4 is a schematic diagram of operations of the electronic system 2 shown in FIG. 2 according to an alternative embodiment of the invention. Please note that the units in the electronic system 2 shown in FIG. 4 with the same designations as those in FIG. 3 have similar operations and functions, and further description thereof is omitted for brevity. The interconnections of the units are as shown in FIG. 4. Compared with FIG. 3, the signal transmission circuit 206 shown in FIG. 4 includes a data transmission interface circuit 2064, and the signal transmission circuit 308 shown in FIG. 4 includes a data transmission interface circuit 3084. The data transmission interface circuit 2064 and the data transmission interface circuit 3084 may be transmission interface circuits compatible with USB 4.0 or above version, which capable of supporting USB 4.0 or above version standard specification. A signal cable 40 is coupled between the data transmission interface circuit 2064 of the host device 20 and the data transmission interface circuit 3084 of the display device 30. The host device 20 may be connected to the display device 30 via the signal cable 40. The signal cable 40 may be an interface component compatible with USB 4.0 or above version standard specification.

In an embodiment, when the host device 20 wants to provide an image frame signal SA1 to the display device 30 for display. As show in FIG. 4, the processing circuit 202 is configured to generate the image frame signal SA1. For example, the image frame signal SA1 may be an image frame signal of an eDP interface. The signal conversion circuit 204 converts the image frame signal SA1 into the USB signal S1. The USB signal S1 may conform to USB 4.0 or above version standard specification. The data transmission interface circuit 2064 transmits the USB signal S1 to the data transmission interface circuit 3084 of the display device 30 through the signal cable 40. The data transmission interface circuit 3084 receives the USB signal S1 and provides the USB signal S1 to the signal conversion circuit 306. The signal conversion circuit 306 converts the USB signal S1 into the image frame signal SA1 and provides the image frame signal SA1 to the display panel 302. The display panel 302 receives the image frame signal SA1 and displays the image frame signal SA1. As a result, the display device 30 obtains the image frame signal SA1 provided by the host device through the data transmission interface circuit 3084.

As shown in FIG. 4, the signals associated with the display device 30 includes the identification signal SB1 of HDMI, the touch detection signal SB2 of I2C, the camera image signal SC1, the audio signal SC2 of I2C and the light detection signal SC3 of I2C. If the display device 30 needs to provide the identification signal SB1, the touch detection signal SB2, the camera image signal SC1, the audio signal SC2 and the light detection signal SC3 to the host device 20, the signal conversion circuit 306 may convert the identification signal SB1, the touch detection signal SB2, the camera image signal SC1, the audio signal SC2 and the light detection signal SC3 into the USB signal S2 conforming to USB 4.0 or above version standard specification. Moreover, the data transmission interface circuit 3084 transmits the USB signal S2 to the data transmission interface circuit 2064 via the signal cable 40. Further, the signal conversion circuit 204 converts the USB signal S2 into the identification signal SB1 of HDMI, the touch detection signal SB2 of I2C, the camera image signal SC1, the audio signal SC2 of I2C and the light detection signal SC3 of I2C, and provides the identification signal SB1, the touch detection signal SB2, the camera image signal SC1, the audio signal SC2 and the light detection signal SC3 to the processing circuit 202 for the following operation. In other words, the display device 30 may transmit signals to the host device 20 or receive signals from the host device 20 by using the data transmission interface circuit 3084 compatible with USB 4.0 or above version standard specification. Since the data transmission interface circuit 3084 utilizes transmission interface with USB 4.0 or above version and the USB 4.0 transmission interface merely requires to use an 8-pin signal cable, the embodiments of the invention may greatly reduce the number of signal cables passing through the base shaft of the display device 30. The conventional display device often requires to use dozens or hundreds of signal cables to connect to the host device. In comparison, the display device 30 of embodiments of the invention does not need to utilize a large number of signal cables to connect with the host device 20 for signal transmission, thus convenient to arrange the cables during the manufacturing process and facilitating automated assembly manufacturing.

To sum up, the embodiments of the invention signal utilize the signal conversion circuit to convert signals into the UBS signal with single signal specification conforming to USB 4.0 or above version standard specification and utilizes the signal transmission circuit to transmit the UBS signal by using wireless communications or transmission interface circuit compatible with USB 4.0 or above version standard specification for signal transmission. Therefore, the embodiments of the invention do not need to utilize a large number of signal cables to connect with the host device for transmitting or receiving transmission signals and thus simplifying the cable management process, saving cost of signal cable and facilitating automated assembly manufacturing process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
 a host device, comprising:
  a first signal conversion circuit for converting signals associated with the host device into a first universal serial bus signal; and
  a first signal transmission circuit coupled to the first signal conversion circuit for transmitting the first universal serial bus signal; and
 a display device, comprising:
  a display panel;
  a second signal transmission circuit for receiving the first universal serial bus signal from the first signal transmission circuit or transmitting a second universal serial bus signal associated with the display device to the first signal transmission circuit; and
  a second signal conversion circuit coupled to the second signal transmission circuit for converting the first universal serial bus signal into the signals associated with the host device or converting signals associated with the display device into the second universal serial bus signal;
  wherein the first universal serial bus signal and the second universal serial bus signal conform to universal serial bus 4.0 or above version standard specification.

2. The electronic system of claim 1, wherein the first signal transmission circuit comprises a first wireless communication circuit, the first wireless communication circuit transmits the first universal serial bus signal to the display device or receives the second universal serial bus signal transmitted by the second signal transmission circuit in a wireless manner, the second signal transmission circuit comprises a second wireless communication circuit, the second wireless communication circuit receives the first universal serial bus signal transmitted by the first signal transmission circuit or transmits the second universal serial bus signal to the first signal transmission circuit in the wireless manner.

3. The electronic system of claim 2, wherein the first wireless communication circuit comprises a first antenna, the second wireless communication circuit comprises a second antenna, the first wireless communication circuit converts the first universal serial bus signal into a first wireless transmission signal, the first wireless transmission signal is transmitted to the second antenna through the first antenna, the second wireless communication circuit converts the first wireless transmission signal received by the second antenna into the first universal serial bus signal, the second wireless communication circuit converts the second universal serial bus signal into a second wireless transmission signal, the second wireless transmission signal is transmitted to the first antenna through the second antenna, the first wireless communication circuit converts the second wireless transmission signal received by the first antenna into the second universal serial bus signal.

4. The electronic system of claim 3, wherein the first wireless communication circuit and the second wireless communication circuit are fifth generation mobile communication network communication circuits, and the first antenna and the second antenna are multiple-input and multiple-output antennas of the fifth generation mobile communication network.

5. The electronic system of claim 1, wherein the first signal transmission circuit comprises a first data transmission interface circuit, the first data transmission interface circuit is coupled to the display device for transmitting the first universal serial bus signal to the display device or receiving the second universal serial bus signal transmitted by the display device, the second signal transmission circuit comprises a second data transmission interface circuit, the second data transmission interface circuit receives the first universal serial bus signal transmitted by the first data transmission interface circuit and transmits the second universal serial bus signal to the first data transmission interface circuit, wherein the first data transmission interface circuit and the second data transmission interface circuit conform to universal serial bus 4.0 or above version standard specification.

6. The electronic system of claim 1, wherein the first signal transmission circuit receives the second universal serial bus signal transmitted by the second signal transmission circuit, and the first signal conversion circuit converts the second universal serial bus signal into the signals associated with the display device.

7. The electronic system of claim 1, wherein the signals associated with the host device comprises an image frame signal, the image frame signal is converted into the first universal serial bus signal by the first signal conversion circuit, the second signal conversion circuit converts the first universal serial bus signal into the image frame signal, and the display panel displays the image frame signal.

8. The electronic system of claim 1, wherein the display panel generates an identification signal and a touch detection signal, the display device further comprises at least one of a camera for generating a camera image signal, a microphone for generating an audio signal and a light sensor for generating a light detection signal, and the signals associated with the host device comprises at least one of the identification signal, the touch detection signal, the camera image signal, the audio signal and the light detection signal.

9. A display device, comprising:
a display panel;
a signal conversion circuit for converting a first universal serial bus signal associated with a host device into signals associated with the host device or converting signals associated with the display device into a second universal serial bus signal; and
a signal transmission circuit coupled to the signal conversion circuit for receiving first universal serial bus signal transmitted by the host device or transmitting the second universal serial bus signal to the host device;
wherein the first universal serial bus signal and the second universal serial bus signal conform to universal serial bus 4.0 or above version standard specification.

10. The display device of claim 9, wherein the signal transmission circuit comprises a wireless communication circuit, the wireless communication circuit transmits the second universal serial bus signal to the host device or receives the first universal serial bus signal transmitted by the host device in a wireless manner.

11. The display device of claim 10, wherein the wireless communication circuit comprises an antenna, the wireless communication circuit converts the second universal serial bus signal into a wireless transmission signal, the wireless transmission signal is transmitted to the host device through the antenna.

12. The display device of claim 11, wherein the wireless communication circuit is a fifth generation mobile communication network communication circuits, and the antenna is a multiple-input and multiple-output antennas of the fifth generation mobile communication network.

13. The display device of claim 9, wherein the signal transmission circuit comprises a data transmission interface circuit, the data transmission interface circuit is coupled to the host device for transmitting the second universal serial bus signal to the host device or receiving the first universal serial bus signal transmitted by the host device, wherein the data transmission interface circuit conforms to universal serial bus 4.0 or above version standard specification.

14. The display device of claim 9, wherein the signals associated with the host device comprises an image frame signal, the image frame signal is converted into the first universal serial bus signal and the first universal serial bus signal is transmitted to the signal transmission circuit, the signal transmission circuit converts the first universal serial bus signal into the image frame signal, and the display panel displays the image frame signal.

15. The display device of claim 9, wherein the display panel generates an identification signal and a touch detection signal, the display device further comprises at least one of a camera for generating a camera image signal, a microphone for generating an audio signal and a light sensor for generating a light detection signal, and the signals associated with the host device comprises at least one of the identification signal, the touch detection signal, the camera image signal, the audio signal and the light detection signal.

* * * * *